(12) United States Patent
Alber et al.

(10) Patent No.: US 10,589,854 B2
(45) Date of Patent: Mar. 17, 2020

(54) AIRCRAFT WITH OVERLAPPED ROTORS

(71) Applicant: Sikorsky Aircraft Corporation, Stratford, CT (US)

(72) Inventors: Mark R. Alber, Milford, CT (US); Jeffrey Parkhurst, Meriden, CT (US); Charles Gayagoy, Orange, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 728 days.

(21) Appl. No.: 15/285,207

(22) Filed: Oct. 4, 2016

(65) Prior Publication Data

US 2017/0101176 A1    Apr. 13, 2017

Related U.S. Application Data

(60) Provisional application No. 62/238,430, filed on Oct. 7, 2015.

(51) Int. Cl.
| | | |
|---|---|---|
| *B64C 29/00* | (2006.01) | |
| *B64C 3/16* | (2006.01) | |
| *B64C 3/32* | (2006.01) | |
| *B64D 27/12* | (2006.01) | |

(52) U.S. Cl.
CPC ........... *B64C 29/0033* (2013.01); *B64C 3/16* (2013.01); *B64C 3/32* (2013.01); *B64D 27/12* (2013.01)

(58) Field of Classification Search
CPC ...... B64C 29/0033; B64C 27/08; B64C 27/28
USPC ....................................................... 244/7 A
See application file for complete search history.

(56) References Cited

U.S. PATENT DOCUMENTS

| | | | | |
|---|---|---|---|---|
| 1,964,179 A | * | 6/1934 | Roth | B64C 29/0033 |
| | | | | 416/93 R |
| 2,589,826 A | * | 3/1952 | Larsen | B64C 27/08 |
| | | | | 416/111 |
| 3,514,052 A | | 5/1970 | McKeown | |
| 6,607,161 B1 | | 8/2003 | Krysinski et al. | |
| 8,376,264 B1 | * | 2/2013 | Hong | B64C 27/26 |
| | | | | 244/17.23 |
| 8,950,698 B1 | * | 2/2015 | Rossi | B64C 37/02 |
| | | | | 244/2 |
| 2005/0178879 A1 | | 8/2005 | Mao | |
| 2007/0084962 A1 | * | 4/2007 | Zientek | B64C 27/08 |
| | | | | 244/17.11 |
| 2011/0226892 A1 | * | 9/2011 | Crowther | B64C 1/30 |
| | | | | 244/17.23 |

(Continued)

FOREIGN PATENT DOCUMENTS

| | | | | |
|---|---|---|---|---|
| CA | 2369837 A1 | * | 8/2002 | ............. B64C 27/08 |
| GB | 935715 A | | 9/1963 | |
| WO | WO-2017000156 A1 | * | 1/2017 | ............. B64C 27/08 |

*Primary Examiner* — Christopher P Ellis
(74) *Attorney, Agent, or Firm* — Cantor Colburn LLP

(57) ABSTRACT

An aircraft is provided and includes a fuselage from which a tilt-wing respectively extends, first prop-rotors, which are formed to define first rotor disks and which are respectively disposed on first portions of each side of the tilt-wing, second prop-rotors, which are formed to define second rotor disks and which are respectively disposed on second portions of each side of the tilt-wing such that the corresponding pairs of first and second rotor disks overlap, and a drive shaft system. The drive shaft system is configured to synchronize respective operations of the first and second prop-rotors.

8 Claims, 5 Drawing Sheets

(56) References Cited

U.S. PATENT DOCUMENTS

| | | | |
|---|---|---|---|
| 2011/0315809 A1* | 12/2011 | Oliver | B64C 29/0033 |
| | | | 244/12.4 |
| 2015/0102175 A1* | 4/2015 | Guetta | B64C 27/473 |
| | | | 244/7 A |
| 2016/0052626 A1* | 2/2016 | Vander Mey | B64C 27/02 |
| | | | 244/17.11 |
| 2018/0346111 A1* | 12/2018 | Karem | B64C 27/80 |
| 2018/0370625 A1* | 12/2018 | Netzer | B64C 27/28 |
| 2019/0127056 A1* | 5/2019 | Weekes | B64C 27/08 |
| 2019/0127060 A1* | 5/2019 | Heinen | B64C 29/0033 |
| 2019/0176980 A1* | 6/2019 | Brand | B64C 11/28 |

* cited by examiner

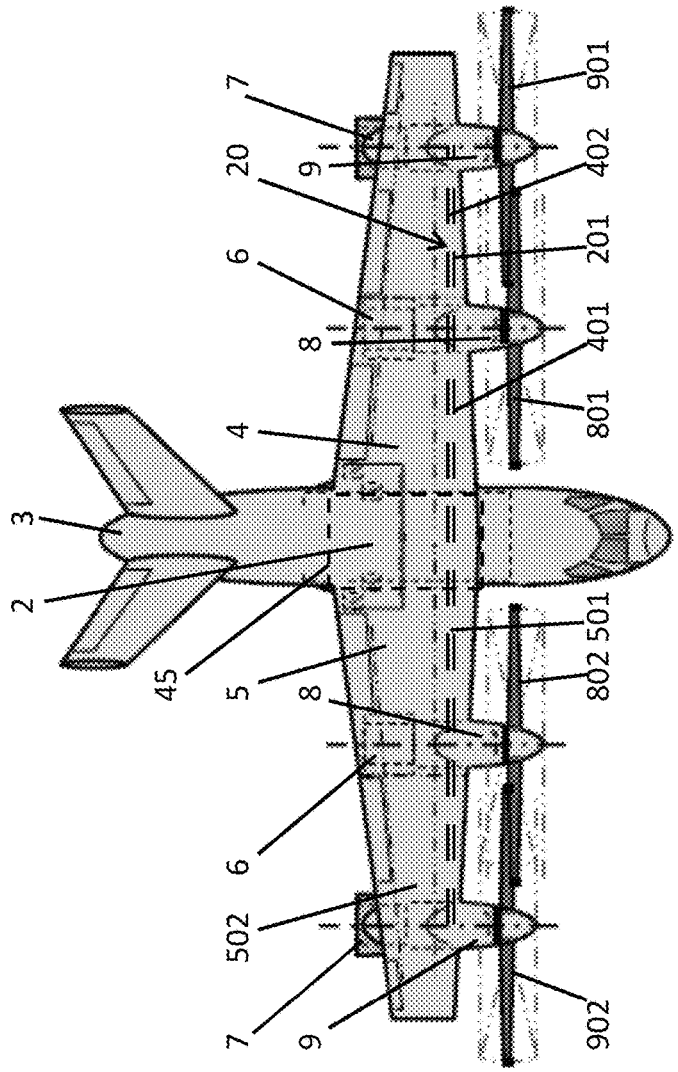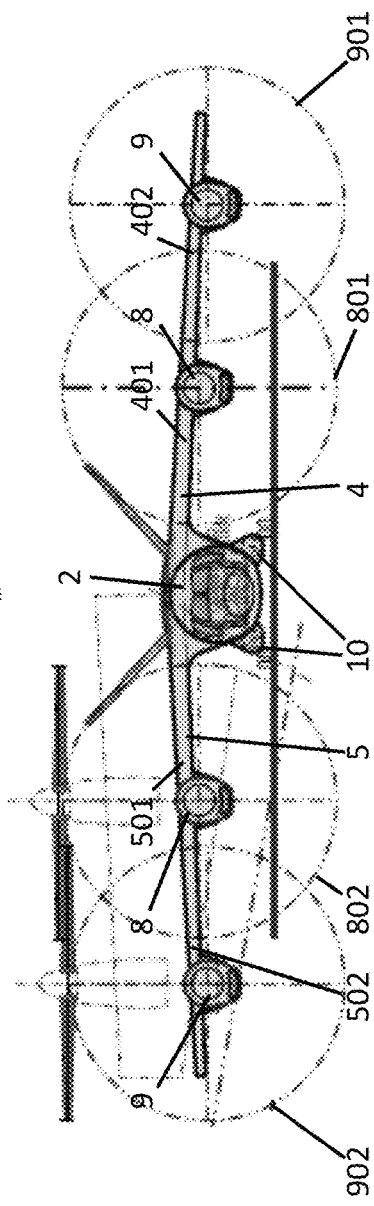
FIG. 4B
FIG. 4A

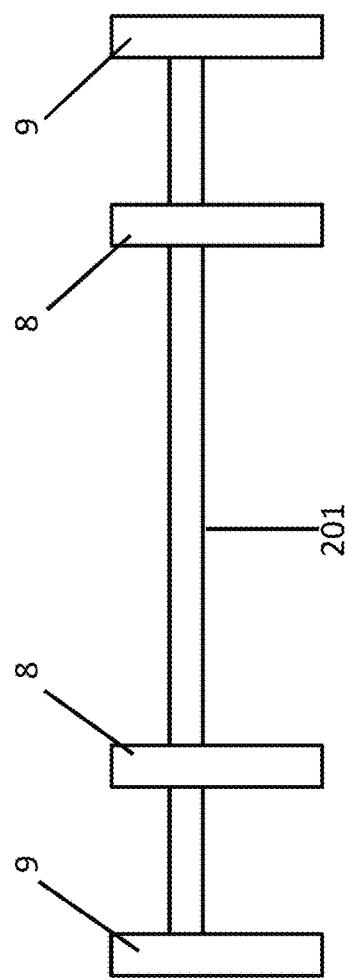

AIRCRAFT WITH OVERLAPPED ROTORS

CROSS-REFERENCE TO RELATED APPLICATIONS

This application claims benefit of priority of U.S. Provisional Application No. 62/238,430 filed on Oct. 7, 2015, the disclosure of which is incorporated by reference.

BACKGROUND OF THE DISCLOSURE

The subject matter disclosed herein relates to aircraft configurations and, more particularly, to aircraft configurations including overlapped prop-rotors.

A vertical take-off and landing (VTOL) aircraft is an aircraft that is capable of performing vertical (or short in the case of STOL aircraft) take-off and hover flight operations as well as forward flight operations. VTOL or STOL aircraft may be provided with fixed-wing or tilt-wing configurations that each have coincident benefits for given flight regimes.

Recently, emerging requirements indicate that needs exist for large VTOL transport aircraft. In such cases, performance and mission requirements may be defined that result in solutions requiring four prop-rotors. A four prop-rotor tiltiwing configuration can offer VTOL capabilities with fixed wing performance but often exhibit some adverse effects. For example, the placement of four prop-rotors along a wing span of a particular VTOL aircraft may result in the aircraft having a relatively large wing span that adversely affects overall operating width, ground clearance and prop-whirl flutter.

BRIEF DESCRIPTION OF THE DISCLOSURE

According to one aspect of the disclosure, an aircraft is provided and includes a fuselage from which a tilt-wing respectively extends, first prop-rotors, which are formed to define first rotor disks and which are respectively disposed on first portions of each side of the tilt-wing, second prop-rotors, which are formed to define second rotor disks and which are respectively disposed on second portions of each side of the tilt-wing such that the corresponding pairs of first and second rotor disks overlap, and a drive shaft system. The drive shaft system is configured to synchronize respective operations of the first and second prop-rotors.

According to alternative or additional embodiments, the aircraft further includes alighting elements on which the fuselage sits in a grounded-condition.

According to alternative or additional embodiments, the second prop-rotors are displaced from distal ends of the tilt-wing.

According to alternative or additional embodiments, the first portions of each side of the tilt-wing respectively include dihedral, inboard tilt-wing sections and the second portions of each side of the tilt-wing respectively include anhedral, outboard tilt-wing sections.

According to alternative or additional embodiments, the first portions of each side of the tilt-wing respectively include anhedral, inboard tilt-wing sections and the second portions of each side of the tilt-wing respectively include dihedral, outboard tilt-wing sections.

According to alternative or additional embodiments, each of the first and second prop-rotors is respectively controllable with differential collective pitch commands.

According to alternative or additional embodiments, the tilt-wing is tiltable relative to the fuselage to assume forward-flight, short take-off and landing (STOL) and vertical-flight or hover (VTOL) configurations. With the tilt-wing assuming the forward-flight configuration, the second rotor disks trail the first rotor disks, with the tilt-wing assuming the STOL configuration, the second rotor disks trail the first rotor disks and with the tilt-wing assuming the VTOL configuration, the second rotor disks are below the first rotor disks.

According to alternative or additional embodiments, the drive shaft system includes a synchronization cross shaft coupled to each of the first and second prop-rotors.

According to yet another aspect of the disclosure, an aircraft is provided and includes a fuselage having opposite sides, first and second tilt-wing sides respectively extending from the opposite sides of the fuselage and being configured to tilt relative to the fuselage, inboard prop-rotors, which are formed to define inboard rotor disks and which are respectively disposed on inboard portions of each of the first and second tilt-wing sides, outboard prop-rotors, which are formed to define outboard rotor disks and which are respectively disposed on outboard portions of each of the first and second tilt-wing sides such that the corresponding pairs of inboard and outboard rotor disks overlap and a drive shaft system. The drive shaft system is coupled to each of the inboard and outboard prop-rotors and is configured to synchronize respective operations thereof throughout respective flapping envelopes.

According to alternative or additional embodiments, the aircraft includes alighting elements on which the fuselage sits in a grounded-condition.

According to alternative or additional embodiments, the outboard prop-rotors are displaced from distal ends of the tilt-wing sides.

According to alternative or additional embodiments, the inboard portions of each of the tilt-wing sides respectively include dihedral, inboard tilt-wing sections and the outboard portions of each of the tilt-wing sides respectively include anhedral, outboard tilt-wing sections.

According to alternative or additional embodiments, the inboard portions of each of the tilt-wing sides respectively include anhedral, inboard tilt-wing sections and the outboard portions of each of the tilt-wing sides respectively include dihedral, outboard tilt-wing sections.

According to alternative or additional embodiments, each of the inboard and outboard prop-rotors are respectively controllable with differential collective pitch commands.

According to alternative or additional embodiments, the tilt-wing sides are tiltable relative to the fuselage to assume forward-flight, short take-off and landing (STOL) and vertical-flight or hover (VTOL) configurations. With the tilt-wing sides assuming the forward-flight configuration, the outboard rotor disks trail the inboard rotor disks, with the tilt-wing sides assuming the STOL configuration, the outboard rotor disks trail the inboard rotor disks and with the tilt-wing sides assuming the VTOL configuration, the outboard rotor disks are below the inboard rotor disks.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

FIG. 4A is an elevation view of the tilt-wing aircraft overlapped prop-rotors;

FIG. 4B is a top down view of a tilt-wing aircraft with overlapped prop-rotors;

FIG. 5 is a schematic illustration of a drive shaft system in accordance with embodiments;

FIG. 6 is a schematic illustration of a drive shaft system in accordance with alternative embodiments;

The detailed description explains embodiments of the disclosure, together with advantages and features, by way of example with reference to the drawings.

DETAILED DESCRIPTION OF THE DISCLOSURE

As will be described below, a vertical take-off and landing (VTOL) or short take-off and landing (STOL) aircraft is provided with a tilt-wing configuration and overlapped outboard and inboard prop-rotors. The aircraft may, in some cases, include a driveshaft system that synchronizes prop-rotor operations throughout respective flapping envelopes and thus allows for engine nacelles to be positioned relatively close to each other. The aircraft may also be provided with dihedral inboard wing sections and anhedral outboard wing sections or with anhedral inboard wing sections and dihedral outboard wing sections.

Figure 1:
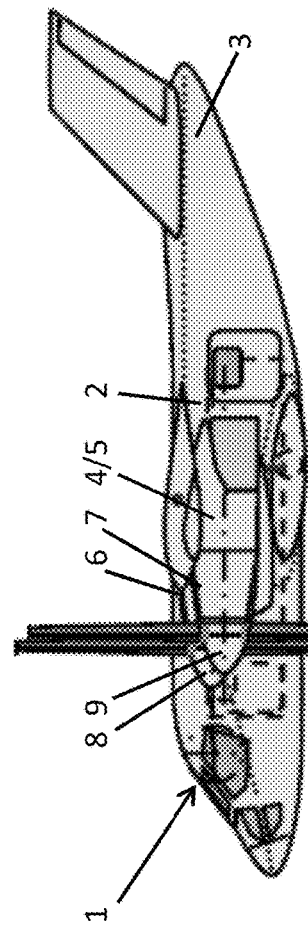
FIG. 1 is a side view of an aircraft in forward-flight mode in accordance with embodiments.
Figure 2:
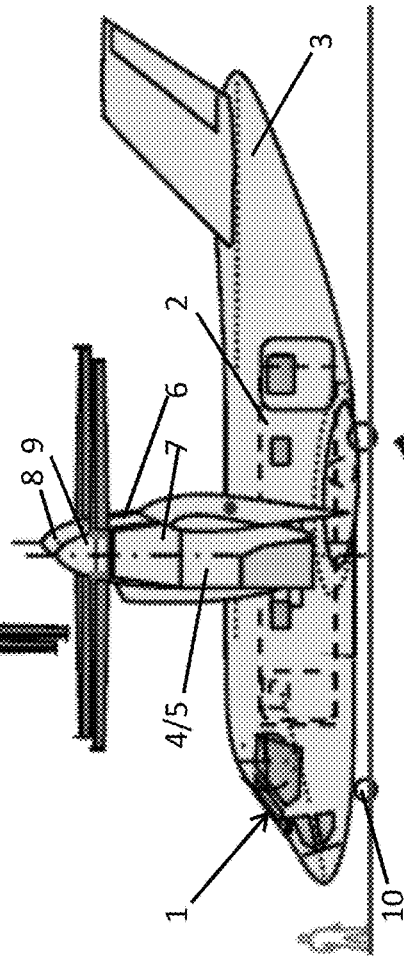
FIG. 2 is a side view of an aircraft in vertical-flight or hover mode in accordance with embodiments.
Figure 3:
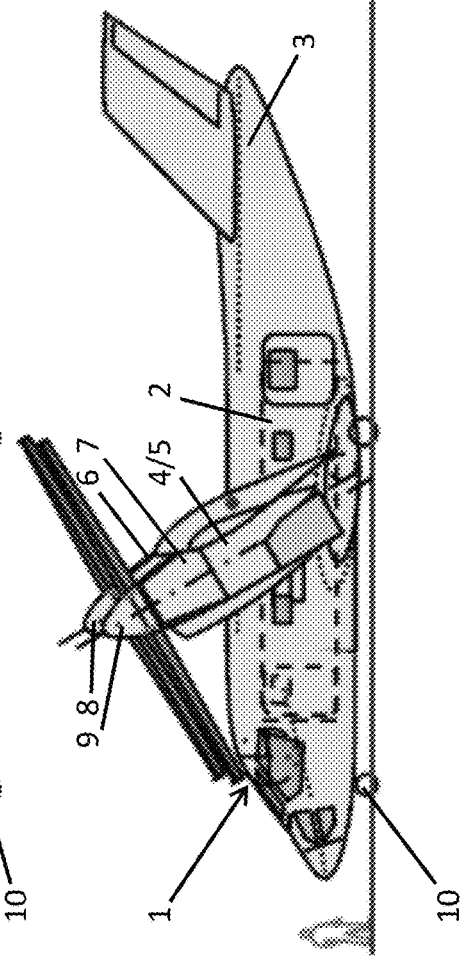
FIG. 3 is a side view of an aircraft in short take-off mode in accordance with embodiments.

With reference to FIGS. 1-3, a VTOL or STOL tilt-wing aircraft 1 is provided and may be configured, for example, as large transport aircraft. In general, the aircraft 1 includes a fuselage 2 that has a leading nose cone end and a trailing tail end, a tail assembly 3, a tilt-wing having a first tilt-wing side 4, a second tilt-wing side 5, inboard engine nacelles 6 and outboard engine nacelles 7. The fuselage 2 has opposite sides and is formed to define a cockpit and a cabin along with storage areas and accommodations for a flight computer and other on-board electrical systems (e.g., air conditioning units, navigational systems, etc.). The tail assembly 3 is disposed at the trailing tail end and includes multiple aerodynamic surfaces that may be controllable, such as a rudder and stabilizer surfaces.

The tilt-wing may be provided as a continuous (i.e., wing-tip to wing-tip) tilt-wing including a connecting section 45 (see FIG. 4B), which is disposed above or at an upper portion of the fuselage 2 to connect the first and second tilt-wing sides 4 and 5. In any case, the first and second tilt-wing sides 4 and 5 extend above or at an upper portion of the fuselage 2 in opposite directions from the opposite sides of the fuselage 2 and may include additional controllable surfaces, such as flaps. The first and second tilt-wing sides 4 and 5 may be configured to be tilted or pivoted (with the connecting section 45) relative to the fuselage 2 about a pivot axis in accordance with a current flight regime (e.g., forward-facing for forward-flight operations, upward for vertical take-off or hover operations or angled for short take-off operations).

The inboard engine nacelles 6 and the outboard engine nacelles 7 may be disposed to hang from lower sides of the first and second tilt-wing sides 4 and 5 and are supportive of inboard prop-rotors 8 and outboard (or trailing/lower) prop-rotors 9, respectively. The inboard prop-rotors 8 and the outboard prop-rotors 9 generate power for driving flight operations. During grounded, landing and short take-off procedures, landing gears (e.g., alighting elements 10) extend downwardly from the fuselage 2 to support the aircraft 1 on the ground.

With reference to FIGS. 4A, 4B, 5 and 6, the inboard prop-rotors 8 are provided on both the first and second tilt-wing sides 4 and 5 and are both formed to define inboard rotor disks 801 and 802. The inboard prop-rotor 8 of the first tilt-wing side 4 is disposed on inboard portion 401 of the first tilt-wing side 4 and the inboard prop-rotor 8 of the second tilt-wing side 5 is disposed on inboard portion 501 of the second tilt-wing side 5. The outboard prop-rotors 9 similarly provided on both the first and the second tilt-wing sides 4 and 5 and are both formed to define outboard rotor disks 901 and 902. The outboard prop-rotor 9 of the first tilt-wing side 4 is disposed on outboard portion 402 of the first tilt-wing side 4 and the outboard prop-rotor 9 of the second tilt-wing side 5 is disposed on outboard portion 502 of the second tilt-wing side 5.

The aircraft 1 further includes a drive shaft system 20, which may be housed in at least one or more of the fuselage 2, the first tilt-wing side 4, the second tilt-wing side 5 and the connecting section 45. In accordance with embodiments, the drive shaft system 20 may reside in a volume of leading edges of the first and second tilt-wing sides 4 and 5 (e.g., between the forward-most part of the first and second tilt-wing sides 4 and 5 and the phantom line in FIG. 4B). In any case, the drive shaft system 20 may include a cross-shaft 201 (see FIG. 4B) that is coupled to each of the two inboard prop-rotors 8 and each of the two outboard prop-rotors 9 and is configured to synchronize respective operations thereof throughout respective flapping envelopes. As a result, the timing of the rotations of the inboard and outboard prop-rotors 8 and 9 can be controlled such that the inboard rotor disks 801 and 802 can overlap with the outboard rotor disks 901 and 902 with no risk of rotor blade interference or impacts.

In accordance with embodiments, the cross-shaft 201 may be provided as a single cross-shaft 201 that spans portions of the fuselage 2, the first tilt-wing side 4, the second tilt-wing side 5 and the connecting section 45 (see FIG. 5) or as first and second cross-shafts 201' and 201" that are respectively contained within the first tilt-wing side 4 and the second tilt-wing side 5. In the latter case, the first and second cross-shafts 201' and 201" may be coupled to one another by way of a transmission or central shaft system.

As shown in FIG. 4A (and in FIGS. 7A and 8A), with the outboard rotor disks 901 and 902 overlapping with the inboard rotor disks 801 and 802, the outboard prop-rotors 9 may be displaced inwardly (i.e., toward the fuselage 2) from respective distal ends of the first and second tilt-wing sides 4 and 5. As such, a wing-span of the aircraft 1 may be decreased as compared to conventional aircraft of similar configuration while a ground clearance between the outboard prop-rotors 9 and a ground surface clearance may be increased as compared to the conventional aircraft of similar configuration.

In accordance with embodiments, each of the inboard prop-rotors 8 and each of the outboard prop-rotors 9 may be respectively controllable with differential collective pitch commands that mitigate or remove any need for differential cyclic control capability.

Figure 7C:
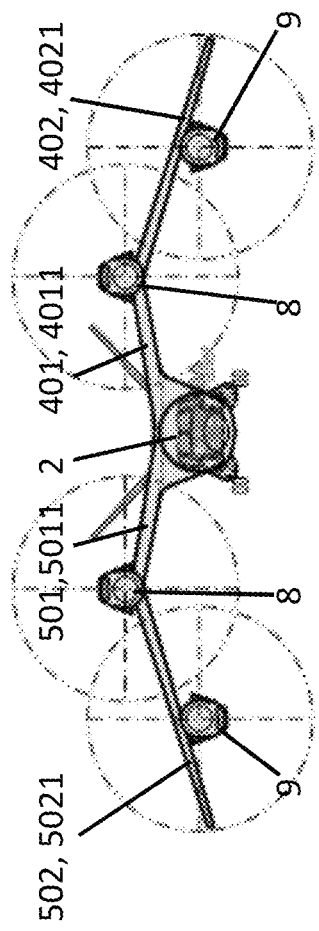
FIG. 7C is an elevation view of a tilt-wing aircraft with overlapped prop-rotors and dihedral and anhedral wing sections in forward-flight mode.
Figure 7A:
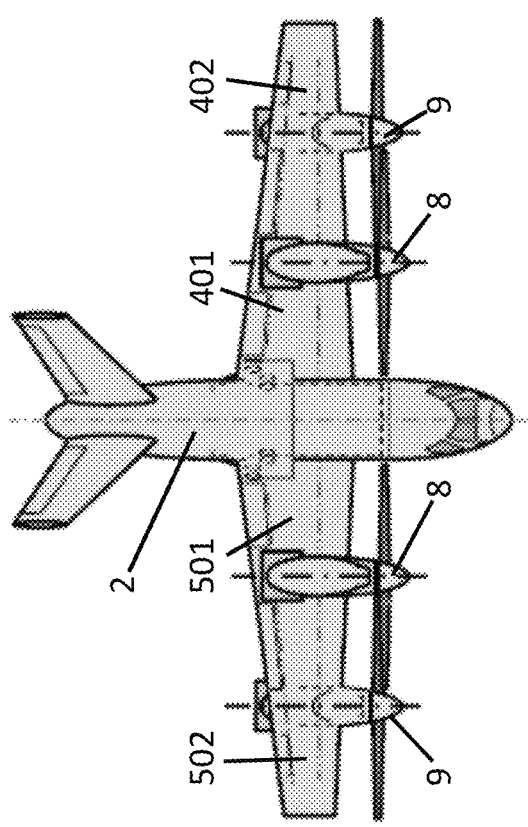
FIG. 7A is an elevation view of a tilt-wing aircraft with overlapped prop-rotors and dihedral and anhedral wing sections.
Figure 7B:
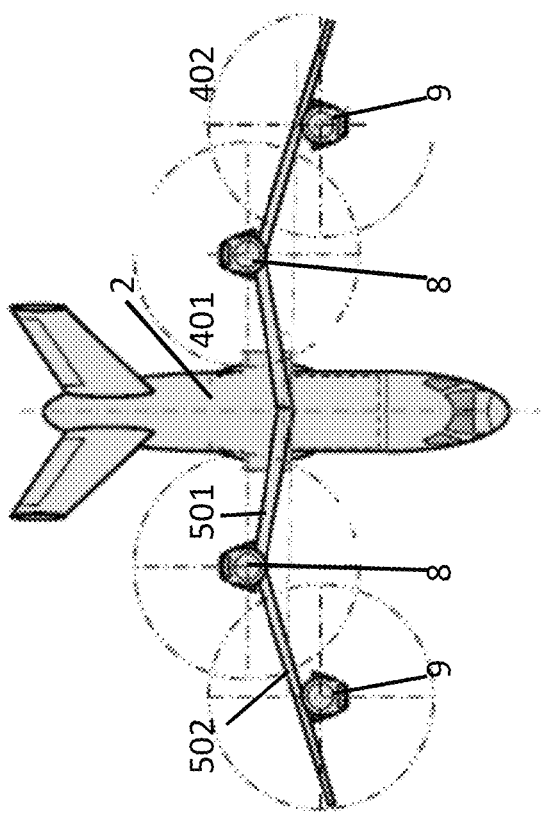
FIG. 7B is an elevation view of a tilt-wing aircraft with overlapped prop-rotors and dihedral and anhedral wing sections in vertical-flight or hover mode.

With reference to FIGS. 7A-7C and, in accordance with embodiments, the inboard portions 401 and 501 of each of the first and second tilt-wing sides 4 and 5 may respectively include dihedral, inboard tilt-wing sections 4011 and 5011 while the outboard portions 402 and 502 of each of the first and second tilt-wing sides 4 and 5 may respectively include anhedral, outboard tilt-wing sections 4021 and 5021. Such a configuration allows for a relocation of the inboard prop-rotors 8 and the outboard prop-rotors 9. That is, when the aircraft 1 is in VTOL mode, for example, the configuration of FIGS. 7A-7C results in the inboard prop-rotors 8 being placed in a relatively forward location and the outboard prop-rotors 9 being placed in a relatively aft location. Thus, with each of the inboard prop-rotors 8 and each of the outboard prop-rotors 9 being controllable by differential collective controls, cyclic control of any of the inboard prop-rotors 8 or the outboard prop-rotors 9 is not needed.

Figure 8B:
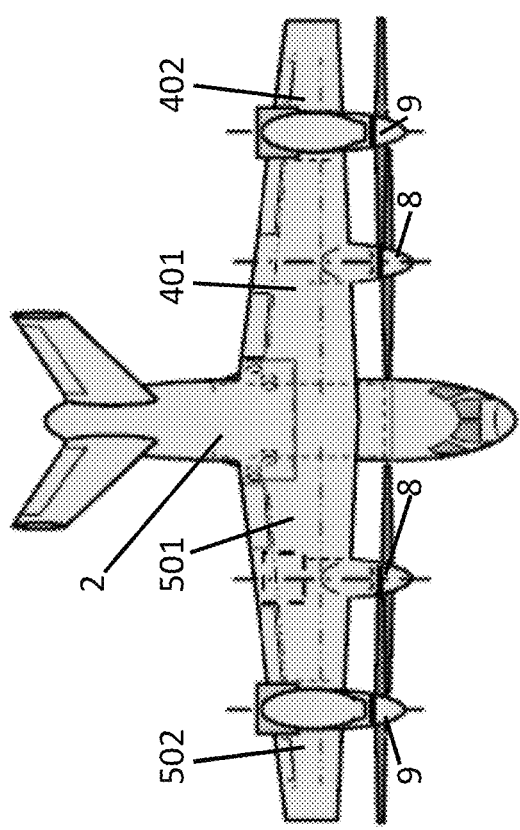
FIG. 8B is an elevation view of a tilt-wing aircraft with overlapped prop-rotors and anhedral and dihedral wing sections in vertical-flight or hover mode.
Figure 8C:
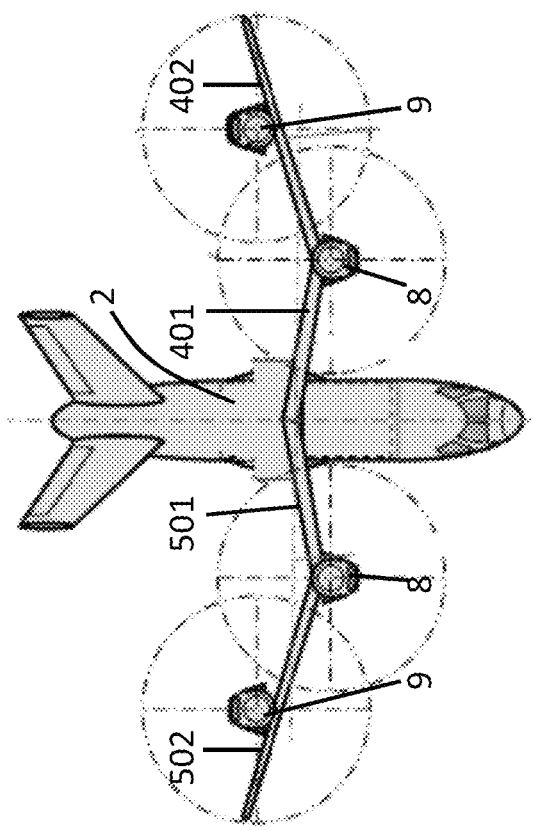
FIG. 8C is an elevation view of a tilt-wing aircraft with overlapped prop-rotors and anhedral and dihedral wing sections in forward-flight mode.
Figure 8A:
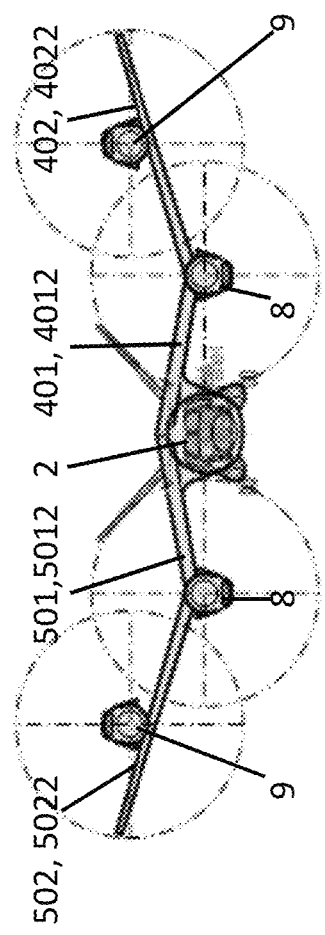
FIG. 8A is an elevation view of a tilt-wing aircraft with overlapped prop-rotors and anhedral and dihedral wing sections.

With reference to FIGS. 8A-8C and, in accordance with embodiments, the inboard portions 401 and 501 of each of the first and second tilt-wing sides 4 and 5 may respectively include anhedral, inboard tilt-wing sections 4012 and 5012 while the outboard portions 402 and 502 of each of the first and second tilt-wing sides 4 and 5 may respectively include dihedral, outboard tilt-wing sections 4022 and 5022. Such a configuration allows for a relocation of the inboard prop-rotors 8 and the outboard prop-rotors 9. That is, when the aircraft 1 is in VTOL mode, for example, the configuration of FIGS. 8A-8C results in the inboard prop-rotors 8 being placed in a relatively aft location and the outboard prop-rotors 9 being placed in a relatively forward location. Thus, with each of the inboard prop-rotors 8 and each of the outboard prop-rotors 9 being controllable by differential collective controls, cyclic control of any of the inboard prop-rotors 8 or the outboard prop-rotors 9 is not needed.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements and/or components, but do not preclude the presence or addition of one or more other features, integers, steps, operations, element components and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. An aircraft, comprising:
   a fuselage from which a tilt-wing respectively extends;
   first prop-rotors, which are formed to define first rotor disks and which are respectively disposed on first portions of each side of the tilt-wing;
   second prop-rotors, which are formed to define second rotor disks and which are respectively disposed on second portions of each side of the tilt-wing such that the corresponding pairs of first and second rotor disks overlap; and
   a drive shaft system configured to synchronize respective operations of the first and second prop-rotors.

2. The aircraft according to claim 1, further comprising alighting elements on which the fuselage sits in a grounded-condition.

3. The aircraft according to claim 1, wherein the second prop-rotors are displaced from distal ends of the tilt-wing.

4. The aircraft according to claim 1, wherein the first portions of each side of the tilt-wing respectively comprise dihedral, inboard tilt-wing sections and the second portions of each side of the tilt-wing respectively comprise anhedral, outboard tilt-wing sections.

5. The aircraft according to claim 1, wherein the first portions of each side of the tilt-wing respectively comprise anhedral, inboard tilt-wing sections and the second portions of each side of the tilt-wing respectively comprise dihedral, outboard tilt-wing sections.

6. The aircraft according to claim 1, wherein each of the first and second prop-rotors is respectively controllable with differential collective pitch commands.

7. The aircraft according to claim 1, wherein the tilt-wing is tiltable relative to the fuselage to assume forward-flight, short take-off and landing (STOL) and vertical-flight or hover (VTOL) configurations, wherein:
   with the tilt-wing assuming the forward-flight configuration, the second rotor disks trail the first rotor disks,
   with the tilt-wing assuming the STOL configuration, the second rotor disks trail the first rotor disks, and
   with the tilt-wing assuming the VTOL configuration, the second rotor disks are below the first rotor disks.

8. The aircraft according to claim 1, wherein the drive shaft system comprises a synchronization cross shaft coupled to each of the first and second prop-rotors.

\* \* \* \* \*